United States Patent Office 3,754,002
Patented Aug. 21, 1973

3,754,002
SUBSTITUTED IMIDAZOLINYLMETHYL ANTHRANILATES
Richard E. Brown, Hanover, N.J., assignor to Warner-Lambert Company, Morris Plains, N.J.
No Drawing. Filed Nov. 26, 1971, Ser. No. 202,569
Int. Cl. C07d 49/34
U.S. Cl. 260—309.6                    6 Claims

ABSTRACT OF THE DISCLOSURE

Compounds of the formula are disclosed:

wherein R is hydrogen or alkyl and X is hydrogen, lower alkyl, nitro, halogen or trifluoromethyl. These compounds are prepared as follows:

I + II → III

Compounds in which R is hydrogen are prepared by hydrolysis of the ester with dilute aqueous alkali followed by neutralization with mineral acid. They are useful as pressor agents.

---

The present invention relates to substituted imidazolinylmethyl anthranilates having the following structural formula:

wherein R is hydrogen or lower alkyl of from 1 to 6 carbon atoms such as methyl or ethyl and X is hydrogen, lower alkyl of from 1 to 6 carbon atoms, halogen, such as chloro or bromo, nitro or trifluoromethyl.

The compounds of this invention are prepared by reacting the appropriately substituted anthranilic acid ester I with the readily available 2-chloromethylimidazoline II in an inert solvent such as a lower aliphatic alcohol to give the target compounds III according to the following equation. Alternatively, the reactants can be mixed thoroughly and heated without solvent under nitrogen to a higher temperature to effect reaction.

I + II → III

Compounds in which R=H are prepared by hydrolysis of the ester with dilute mineral acid.

The above compounds when administered to a mammal such as dogs, cats or monkeys stimulate the α-adrenergic nervous system to produce an increase of blood pressure. Thus, for example, Compound IV of the formula:

IV and Compound V of the formula:

V at doses of 0.01 to 0.10 mg./kg. intramuscularly or intravenously, caused moderate to intense increases in blood pressure in the dog for prolonged periods. Because of this potent pressor effect, these compounds are indicated in hypotensive states such as, for example, orthostatic hypotension. The dose regimen is to be individualized but is within the range of 0.01 to 0.10 mg./kg. body weight.

In order to use these compounds, they are formulated into dosage forms such as tablets with diluents such as lactose, mannitol and the like. For parenteral administration they are formulated with vehicles such as water for injection, peanut oil and the like.

The following examples are included in order further to illustrate the invention.

EXAMPLE 1

Methyl-4-chloro-N-[(2-imidazolin-2-yl)methyl] anthranilate

A mixture of 35 g. (0.188 mol) of methyl-4-chloroanthranilate, 14.6 g. (0.094 mol) of 2-chloromethylimidazoline hydrochloride and 30 ml. of methanol was heated with stirring while the methanol was allowed to boil off. The homogeneous residue was heated with stirring at 150° for 3 hours. The mixture was cooled and partitioned between water and ether. The aqueous phase was basified with 20% NaOH and the precipitate filtered, washed and dried to give 20.9 g. of product.

The analytical sample was prepared by recrystallization from ethyl acetate, M.P. 176°–178°.

Analysis.—Calc'd for $C_{12}H_{14}ClN_3O_2$ (percent): C, 53.84; H, 5.27; N, 15.70. Found (percent): C, 53.83; H, 5.19; N, 15.87.

EXAMPLE 2

Methyl N-[(2-imidazolin-2-yl)methyl]-5-methyl anthranilate

Prepared from methyl-5-methyl anthranilate as described in Example 1, M.P. 143°–145°.

Analysis.—Calc'd for $C_{13}H_{17}N_3O_2$ (percent): C, 63.14; H, 6.93; N, 16.99. Found (percent): C, 63.10; H, 7.00; N, 16.88.

EXAMPLE 3

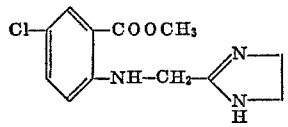

Methyl-5-chloro-N-[(2-imidazolin-2-yl)methyl]anthranilate

Prepared from methyl-5-chloroanthranilate as described in Example 1, M.P. 156°–159°.

Analysis.—Calc'd for $C_{12}H_{14}ClN_3O_2$ (percent): C, 53.84; H, 5.27; N, 15.70. Found (percent): C, 54.02; H, 5.39; N, 15.62.

EXAMPLE 4

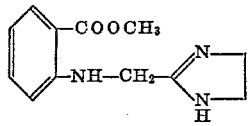

Methyl-N-[(2-imidazolin-2-yl)methyl]anthranilate

Prepared from methylanthranilate as described in Example 1, M.P. 158°–162°.

Analysis.—Calc'd for $C_{12}H_{15}N_3O_2$ (percent): C, 61.79; H, 6.48; N, 18.01. Found (percent): C, 62.35; H, 6.51; N, 17.68.

EXAMPLE 5

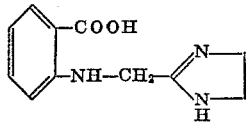

A suspension of 4.6 g. (0.02 mol) of methyl-N-[(2-imidazolin-2-yl)-methyl]anthranilate in 20 ml. of 1.0 N NaOH solution was stirred at 100° for 10 minutes. The solution was cooled, acidified with 20 ml. of 1.0 N HCl, and the precipitate filtered to give 4.0 g. of product.

The analytical sample was prepared by recrystallization from ethanol, M.P. 230°–232°.

Analysis.—Calc'd for $C_{11}H_{11}N_3O_2$ (percent): C, 60.82; H, 5.10; N, 19.35. Found (percent): C, 60.64; H, 5.22; N, 19.45.

I claim:
1. A compound of the formula:

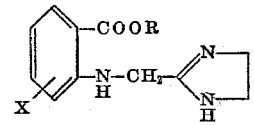

wherein R is hydrogen or lower alkyl, X is hydrogen, lower alkyl, or halogen.

2. A compound according to claim 1 which is methyl-4-chloro-N-[(2-imidazolin-2-yl)methyl]anthranilate.

3. A compound according to claim 1 which is methyl N-[(2-imidazolin-2-yl)methyl]-5-methyl anthranilate.

4. A compound according to claim 1 which is methyl-5-chloro-N-[(2-imidazolin-2-yl)methyl]anthranilate.

5. A compound according to claim 1 which is methyl-N-[(2-imidazolin-2-yl)methyl]anthranilate.

6. A compound according to claim 1 wherein R is hydrogen.

References Cited

UNITED STATES PATENTS

| | | | |
|---|---|---|---|
| 2,252,722 | 8/1941 | Miescher et al. | 260—309.6 |
| 2,449,241 | 9/1948 | Miescher et al. | 260—309.6 |
| 2,616,895 | 11/1952 | Häfliger et al. | 260—309.6 |
| 2,691,658 | 10/1954 | Miescher et al. | 260—309.6 |

FOREIGN PATENTS

| | | | |
|---|---|---|---|
| 1,174,349 | 12/1969 | Great Britain | 260—309.6 |
| 229,741 | 2/1944 | Switzerland | 260—309.6 |
| 234,981 | 1/1945 | Switzerland | 260—309.6 |
| 234,984 | 3/1945 | Switzerland | 260—309.6 |

OTHER REFERENCES

Hughes et al.: Chem. Abst., vol. 32, columns 5830–1 (1938).

NATALIE TROUSOF, Primary Examiner

U.S. Cl. X.R.

424—273